United States Patent [19]

Balchick

[11] 4,089,386
[45] May 16, 1978

[54] DRIVE MOUNT HOUSING FOR A VEHICLE

[75] Inventor: Elmer Balchick, Euclid, Ohio

[73] Assignee: Towmotor Corporation, Mentor, Ohio

[21] Appl. No.: 798,954

[22] Filed: May 20, 1977

[51] Int. Cl.² ............................................. B60K 1/00
[52] U.S. Cl. ............................... 180/64 R; 180/70 R; 248/8
[58] Field of Search ............... 180/54 E, 65 R, 65 A, 180/57, 64 R, 64 M, 70 R; 248/6, 7, 8; 105/133

[56] References Cited

U.S. PATENT DOCUMENTS

| 1,628,145 | 5/1927 | Hertner | 180/56 |
| 1,976,701 | 10/1934 | Trott | 180/64 R |
| 2,477,789 | 8/1949 | Dunham | 180/54 E |
| 2,748,878 | 6/1956 | Le Tourneau | 180/54 E X |
| 3,198,278 | 8/1965 | Kaup | 180/54 E |
| 3,207,249 | 9/1965 | Singer | 180/54 R |
| 3,481,420 | 12/1969 | Roll | 180/65 R |
| 3,534,825 | 10/1970 | Reffle | 180/42 |
| 3,773,132 | 11/1973 | Gawlik | 180/64 R |

Primary Examiner—Joseph F. Peters, Jr.
Assistant Examiner—Terrance L. Siemens
Attorney, Agent, or Firm—Phillips, Moore, Weissenberger, Lempio & Majestic

[57] ABSTRACT

A drive mount and housing for a vehicle provides cantilevered support for a prime mover while enclosing a drive train interconnecting the prime mover with the vehicle transmission. The housing is suspended from angled mounting brackets formed on the vehicle frame by a suspension arrangement which includes fastening brackets and elongated resilient fastening elements.

6 Claims, 4 Drawing Figures

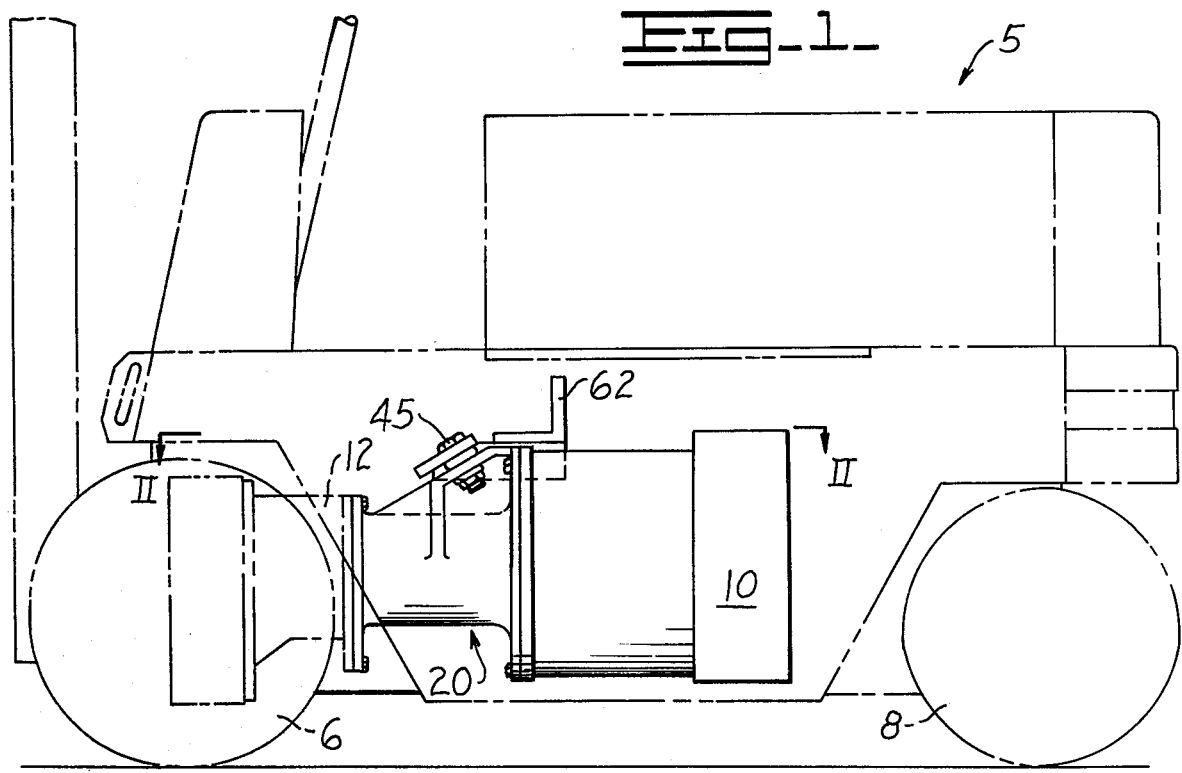
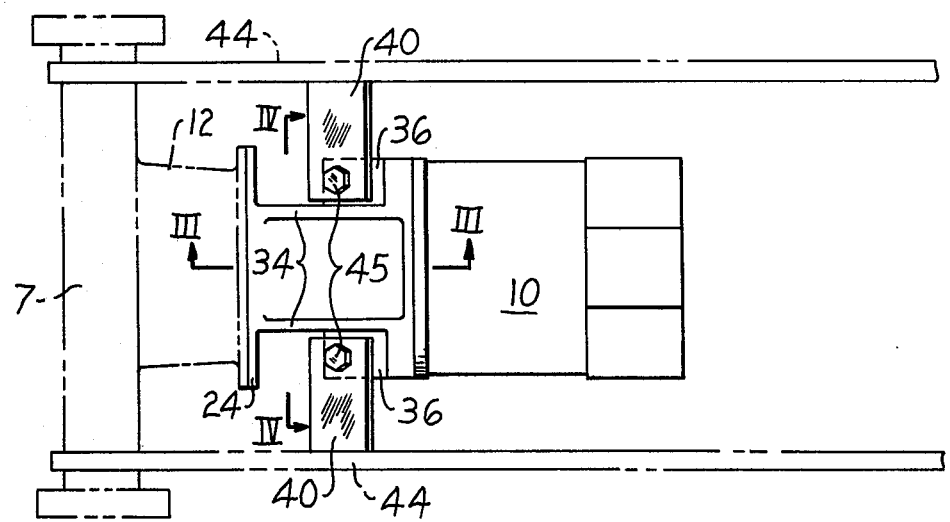

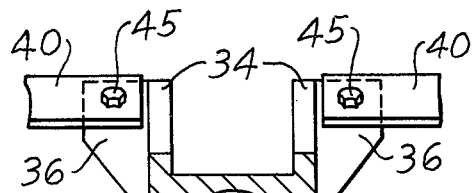
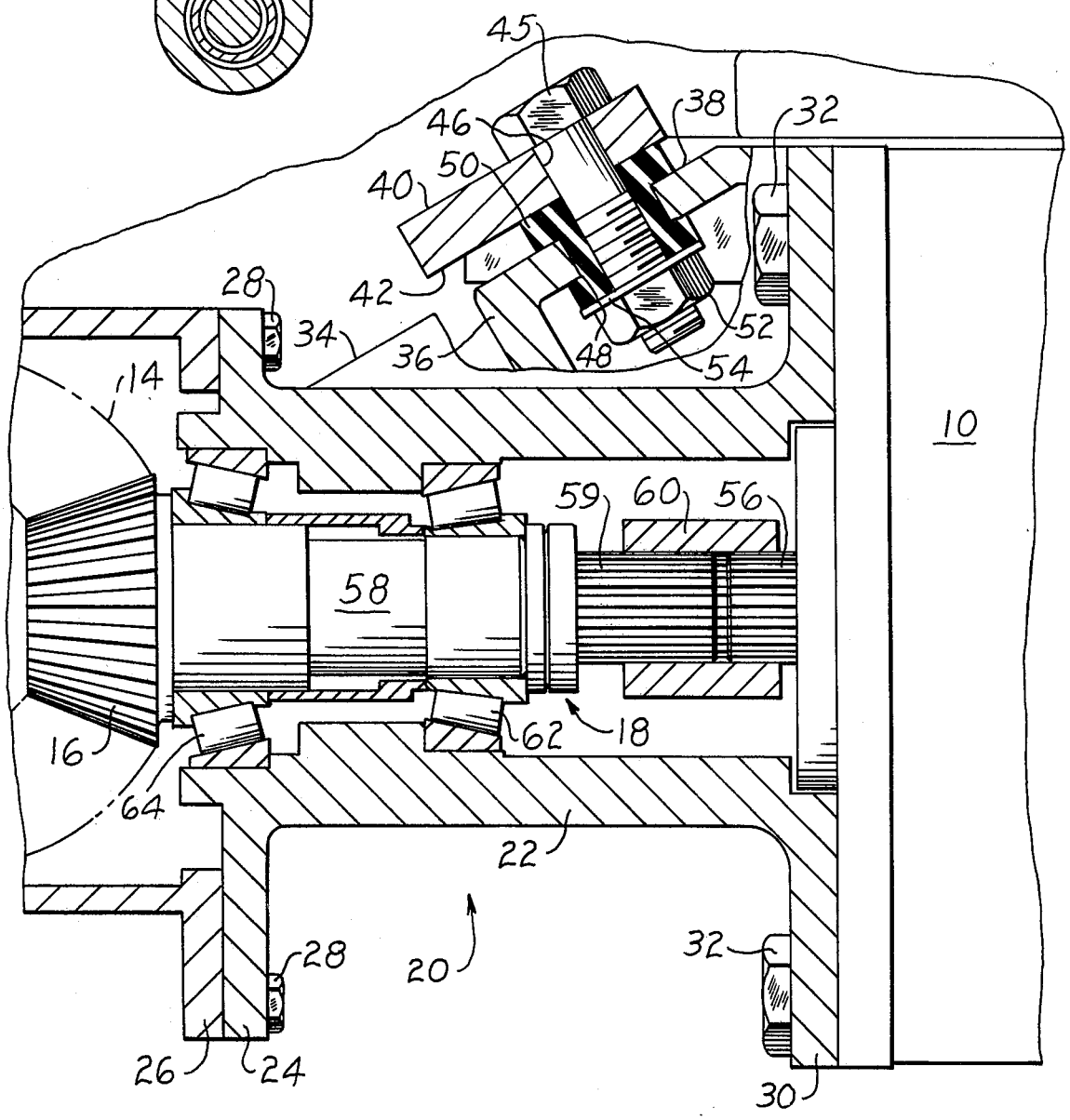

DRIVE MOUNT HOUSING FOR A VEHICLE

BACKGROUND OF THE INVENTION

This invention relates to a housing and drive train for associating a prime mover with a vehicle. In particular, the invention relates to cantilevered suspension of a prime mover from an industrial vehicle, such as a lift truck or the like.

Mounting of a prime mover in an industrial vehicle such as a lift truck or a wheeled tow tractor presents certain unique problems. Generally in such vehicles it is desirable to keep the center of gravity as low as possible, hence the drive axis of the prime mover should be kept low. The prime mover should be protected from damage from outside the vehicle, but it should not be enclosed completely as a cooling problem would arise from complete enclosure. The prime mover should be easily removed and replaced to minimize lost time due to maintenance.

Fixture of the prime mover in the vehicle to the vehicle frame by more than a 2 point suspension system wherein the suspension points are not co-linear generally requires a universal joint between the prime mover and the traction members of the vehicle whether the traction members are wheels or tracks. This is particularly true when the traction members are resiliently mounted relative the vehicle. However, even in installations wherein the traction members are rigidly affixed to the vehicle frame so that shock absorbing is taken care of by associated dirigible wheels, it is still appropriate to use universal joints in mounting prime movers rigidly to the frame. Although technology in universal joints is well advanced, the additional mechanical members in the drive train introduce inefficiencies and complexities which would be desirable to avoid.

The desirability of eliminating universal joints in the drive train coupled with the desirability of providing a mounting for a prime mover which allows for quick disconnect of the prime mover along with other reasons which will become apparent in a study of the following disclosure, prompted the present invention.

SUMMARY OF THE INVENTION

The present invention is directed to overcoming one or more of the problems set forth above.

Broadly stated, the invention is a vehicle drive train housing for a vehicle which includes a prime mover and a transmission. The drive train housing drivingly associates the prime mover with the transmission and comprises a housing for support of the prime mover in a cantilevered fashion. The housing is adapted at one end for a fixture to the vehicle transmission and adapted at the other opposite end for removably receiving the prime mover. Means for drivingly interconnecting the prime mover with the transmission are disposed internal of the housing and include the means for transmitting power from the prime mover to the vehicle. The housing defines support means intermediate the one end and the other opposite end for associating the housing with the vehicle frame, whereby the prime mover is suspended in a cantilevered fashion.

BRIEF DESCRIPTION OF THE DRAWINGS

FIG. 1 is an elevation view of the drive mount housing which is the subject of this invention, shown mounted in an industrial vehicle.

FIG. 2 is a plan view of the same drive mount housing shown in FIG. 1 taken at line II—II of FIG. 1.

FIG. 3 is a view partly in section of the drive mount housing shown in FIG. 2, taken at line III—III of FIG. 2.

FIG. 4 is a sectional view of the drive mount housing shown in FIG. 2, taken at line IV—IV.

DETAILED DESCRIPTION OF THE PREFERRED EMBODIMENT

An industrial vehicle 5, hereinafter referred to as vehicle 5, is shown in FIG. 1. Vehicle 5 may be a lift truck as illustrated in phantom in FIG. 1, or equally as likely may be a tow tractor. Vehicle 5 includes traction members such as wheel 6 mounted on axle 7 (see FIG. 2 ). It is to be understood that there would be a pair of wheels 6, one on either end of axle 7.

In addition to wheel 6, a steering member, such as a dirigible wheel 8, would also be an integral portion of vehicle 5. It is to be understood that dirigible wheel 8 may be resiliently mounted relative vehicle 5 to provide a degree of shock absorbtion during operation over a rough surface.

Vehicle 5 may be powered through a prime mover such as motor 10. Again, it is to be understood that motor 10 may be of internal combustion type or of the electric type driven either by battery or by an electric cable.

Axle 7 of vehicle 5 may include a transmission 12, but will include means for right-angle drive such as bevel gear 14 for drivingly connecting with beveled pinion gear 16, which forms a portion of a drive means 18 disposed in a drive mount housing 20. Drive mount housing 20 includes a generally hollow cylindrical portion 22 which has integrally formed at one end a flange 24. Flange 24 is adapted for mounting adjacent a similarly configured flange 26 at the rear end of transmission 12 to which it may be affixed by appropriate fastening means such as a plurality of bolts 28. At the other opposite end of hollow cylindrical portion 22 is a second flange 30 which is adapted to mountingly receive prime mover 10. Prime mover 10 may be affixed to flange 30 by appropriate fastening means such as a plurality of bolts 32.

Hollow cylindrical portion 22 has extending outwardly therefrom in a tangential fashion a pair of ribs 34. Each rib 34 is triangular in shape, having one side formed by the hollow cylindrical portion 22, a second side formed by a flange 30, and the third side extending from flange 30 in an angled fashion intercepting the hollow cylindrical portion 22 in the vicinity of flange 24. Affixed to each rib 34 and extending outwardly therefrom is an angled fastening bracket 36. Angled fastening bracket 36 defines a fastening surface 38 (see FIG. 3) which is oriented generally parallel to an extended radius of beveled gear 14 which comprises a driven gear in the vehicle transmission.

Vehicle 5 is constructed with a pair of similarly oriented angled support brackets 40 defining fastening surfaces 42. Each angled support bracket 40 is rigidly associated with the vehicle frame 44 by such fastening means as welding or the like.

Forming a part of the mounting means which includes the angled fastening bracket 36 is an elongated fastening member such as bolt 45 which may be disposed through a hole 46 in the support bracket 40 and a similar hole 48 is formed in angle fastening bracket 36. A resilient cushioning member 50 which may take the form of two flanged washers may be disposed about bolt 45 to provide a degree of resilient support for drive mount housing 20 when nuts 52 and washers 54 are fixed to bolts 45 to hold drive mount housing in a position fixed relative to vehicle 5.

Motor 10, as previously noted, is affixed to flange 30 and has extending outwardly therefrom a drive shaft 56. This invention includes a drive means 18 which includes a shaft 58 splined at one end 59 for interconnection with the previously mentioned drive shaft 56 by means of an internally splined sleeve 60. Fixed to the other opposite end of shaft 58 is beveled pinion 16. Shaft 58 is journaled in the hollow cylindrical portion 22 by bearings such as tapered bearing 62 at the rear and tapered bearing 64 at the front.

Operation of the previously described invention should be apparent to those skilled in the art; however, a brief review of the operation is considered necessary for a complete understanding of the invention.

Motor 10 is affixed to housing 20 by means of a plurality of bolts 32. Housing 20 has previously been affixed to vehicle 5 by bolts 45, by affixing fastening brackets 36 relative to angled support bracket 40 with resilient member 50 interposed therebetween. It should be noted that the bolts 45 as indicated in FIGS. 1 and 2 are co-linear and further are substantially perpendicular to an extended radius of beveled gear 14. Therefore, the shock caused arcuate motion of motor 10 about beveled gear 14 caused by vibration of vehicle 5 then can be absorbed by resilient member 50 as the motor 10 swings through the small arc allowed by the resilient member 50. With this relatively rigid cantilevered association of the beveled pinion 16 and the motor 10 with beveled gear 14, a universal joint is unnecessary. Furthermore, disassociation of motor 10 from vehicle 5 may be accomplished by removal of the plurality of bolts 32 and disassociation of any conduit means providing fluid or power to motor 10. Once this is accomplished, the motor 10 is easily moved rightwardly as indicated in FIG. 1 for ultimate removal from the vehicle. It is to be understood that any cowling or the like would have to be removed prior to removal of the motor 10.

Although this invention has been described in relation to a lift truck, it is to be understood that the invention is equally applicable to other industrial trucks and is to be limited only by the appended claims.

I claim:

1. A vehicle drive train mounting, the vehicle including a frame, a prime mover and transmission means, the drive train mounting for drivingly associating said prime mover with said transmission means and comprising:

a housing for support of said prime mover in a cantilevered fashion, said housing adapted at one end for fixture to said vehicle transmission means and adapted at the other opposite end for removably receiving said prime mover; and drive means rotatingly disposed internally of said housing for transmitting power from said prime mover to said vehicle;

said housing defining support means intermediate the one end and the other opposite end for associating said housing with said vehicle frame.

2. The drive train mounting of claim 1 wherein the vehicle is a wheeled vehicle and the transmission means includes a transmission housing associated with one of the vehicle axles and a driven gear rotatable about an axis normal to the axis of the drive means and further wherein the support means comprises an angled fastening bracket including a fastening surface oriented generally parallel to an extended radius of the driven gear, and elongated fastening means, said elongated fastening means removably disposed normal to said extended axis for associating said angled fastening bracket to said vehicle.

3. The drive train mounting of claim 2 wherein said vehicle includes an angled mounting bracket including a fastening surface oriented generally parallel to an extended radius of the driven gear and adapted to receive the elongated fastening means, and further wherein the support means comprises resilient means disposed between said angled mounting bracket and the angled fastening bracket.

4. The drive train mounting of claim 3 wherein the housing comprises a generally hollow cylindrical member having integrally formed at one end a first flange for fixture to the transmission housing and having integrally formed at the second other end a second flange for receiving the prime mover and further wherein the drive means comprises a shaft means for transmitting torque from the prime mover to the driven gear, and bearing means for journaling said shaft means in said housing.

5. The drive train mounting of claim 4 wherein the driven gear comprises a beveled gear having an axis of rotation parallel to the vehicle axle, and further wherein the shaft means comprises a shaft and a beveled pinion gear affixed to the shaft at the end opposite the prime mover for drivingly engaging the driven gear.

6. The drive train mounting of claim 5 wherein the shaft further comprises: a sleeve element, said shaft splined at the end adjacent the prime mover, said sleeve internally splined to interconnect said shaft with said prime mover.

* * * * *